United States Patent
Okada (10) Patent No.: US 6,570,124 B2
(45) Date of Patent: May 27, 2003

(54) LASER PROCESSING METHOD

(76) Inventor: Kuniaki Okada, Room 516, Raporutenri, 2613-1 Ichinomotocho Tenri-shi (JP)

( * ) Notice: Subject to any disclaimer, the term of this patent is extended or adjusted under 35 U.S.C. 154(b) by 0 days.

(21) Appl. No.: 09/941,487

(22) Filed: Aug. 29, 2001

(65) Prior Publication Data

US 2002/0033388 A1 Mar. 21, 2002

(30) Foreign Application Priority Data

Aug. 31, 2000 (JP) ........................................ 2000-263946
May 15, 2001 (JP) ........................................ 2001-145565

(51) Int. Cl.$^7$ ............................................... B23K 26/06
(52) U.S. Cl. ............................... 219/121.73; 219/121.8
(58) Field of Search ....................... 219/121.73, 121.75, 219/121.68, 121.69, 121.8, 121.81

(56) References Cited

U.S. PATENT DOCUMENTS 5,473,426 A * 12/1995 Hayano et al.
5,514,850 A * 5/1996 Miyazaki et al. ...... 219/121.69

FOREIGN PATENT DOCUMENTS

| JP | 63-220989 A | * | 9/1988 |
| JP | 09-206974 | | 8/1997 |
| JP | 11-347766 A | * | 12/1999 |
| JP | 2001-60433 A | * | 3/2001 |

* cited by examiner

Primary Examiner—Geoffrey S. Evans
(74) Attorney, Agent, or Firm—Dike, Bronstein, Roberts & Cushman Intellectual Property Practice Group; David G. Conlin; George W. Hartnell, III (57) ABSTRACT

A laser processing method includes the steps of irradiating a projection mask having a light transmitting area, for allowing a laser beam to be transmitted therethrough, with the laser beam; and irradiating a processing target with the laser beam transmitted through the light transmitting area. A spot of the laser beam on the projection mask is shaped so as to irradiate a portion in the vicinity of first edges of the light transmitting area, the first edges extending in one direction, and so as not to irradiate a portion in the vicinity of second edges of the light transmitting area, the second edges extending in a second direction which is different from the first direction.

9 Claims, 6 Drawing Sheets

LASER PROCESSING METHOD

BACKGROUND OF THE INVENTION

1. Field of the Invention

The present invention relates to a laser processing method for processing a surface of a processing target using laser light, and specifically to a laser processing method preferably usable for ablating a processing target including an organic substance so as to form a flat face which is parallel or inclining with respect to an optical axis of the laser light.

2. Description of the Related Art

One method for processing an organic substance on a substrate by etching uses an ablation function of a laser beam such as, for example, an excimer laser beam.

Figure 14:
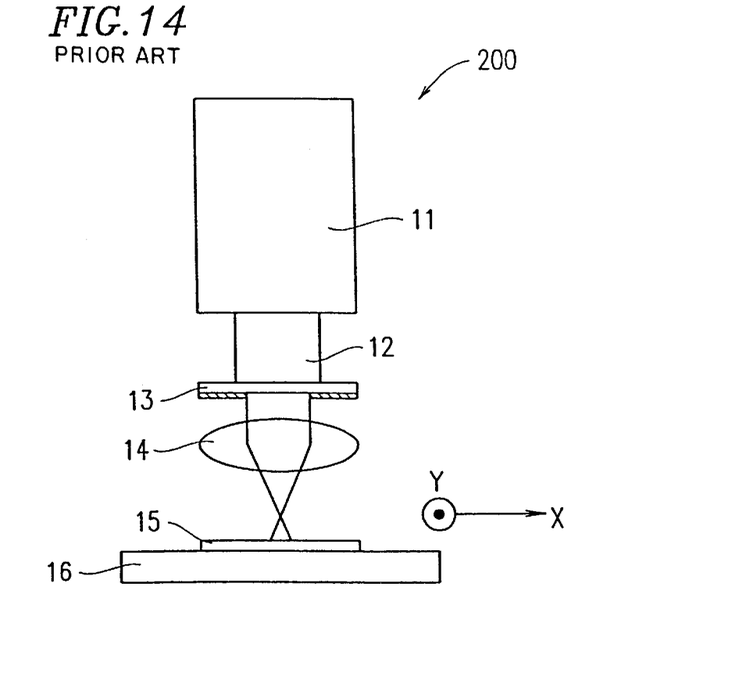
FIG. 14 is a schematic view illustrating a structure of a laser processing apparatus used for a conventional laser processing method.

FIG. 14 shows a schematic view illustrating a structure of a laser processing apparatus 200 usable for performing laser processing. The laser processing apparatus 200 is used for, for example, forming a recessed portion in a processing target 15. The processing target 15 includes an organic sheet formed of, for example, polycarbonate (PC) or polyethylene terephthalate (PET) which is degraded when irradiated with light such as a laser beam. The laser processing apparatus 200 includes an X-Y stage 16 on which the processing target 15 is placed, and a laser oscillator 11 for emitting an excimer laser beam 12 toward the processing target 15. The excimer laser beam 12 emitted by the laser oscillator 11 is provided with a prescribed pattern through a projection mask 13, then is reduced in cross-sectional area by an objective optical system 14, and is directed toward the processing target 15 fixed on the X-Y stage 16.

Figure 6:
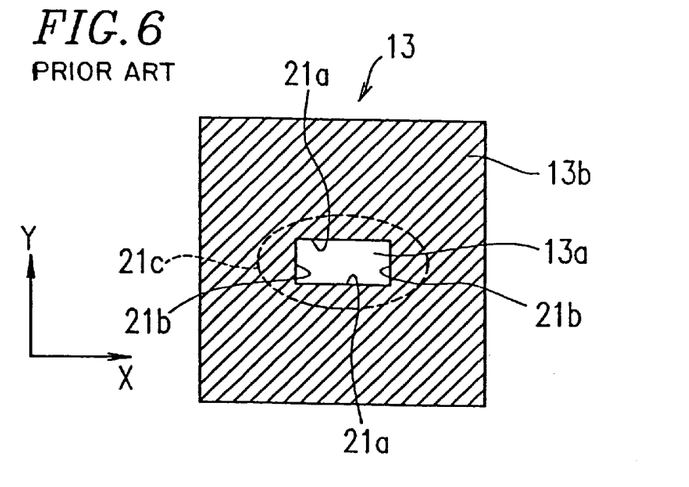
FIG. 6 is a plan view of a conventionally used projection mask.

FIG. 6 is a plan view of the projection mask 13. The projection mask 13 is formed of a glass plate and a metal film provided on the glass plate so as to form a light shielding area 13b. An area of the glass plate which is not covered with the metal film is a rectangular light transmitting area 13a through which the excimer laser beam 12 is allowed to be transmitted.

Figure 7:
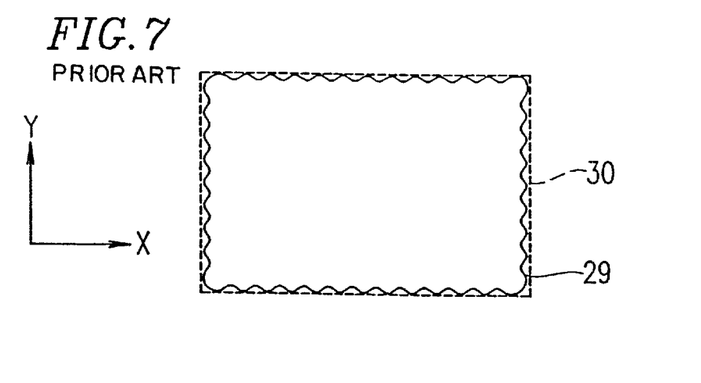
FIG. 7 is a schematic view illustrating a profile of a recessed portion formed by a conventional laser processing method.
Figure 8:
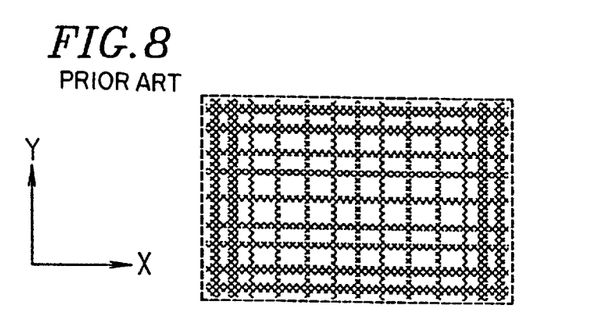
FIG. 8 is a schematic view illustrating a light intensity distribution irradiating a surface of a processing target in accordance with the conventional laser processing method.

A spot 21c of the excimer laser beam 12 on the projection mask 13 is elliptical. The spot 21c on the projection mask 13 covers the light transmitting area 13a so that the entirety of the light transmitting area 13a is uniformly irradiated with the excimer laser beam 12. In FIGS. 6, 7 and 8, arrow X represents a direction of longer sides 21a of the rectangular light transmitting area 13a, and arrow Y represents a direction of shorter sides 21b of the rectangular light transmitting area 13a. In this specification, the direction indicated by arrow X will be described as the "X direction", and the direction indicated by arrow Y will be described as the "Y direction".

The excimer laser beam 12 which is transmitted through the light transmitting area 13a of the projection mask 13 is reduced in cross-sectional area by the objective optical system 14 and collected on the processing target 15 fixed on the X-Y stage 16. Thus, an image of the rectangular light transmitting area 13a is projected on the processing target 15. The image on the processing target 15 reflects the reduction ratio of the objective optical system 14. A surface of the processing target 15 irradiated with the excimer laser beam 12 is ablated with the excimer laser beam 12. As a result, a recessed portion defined by faces parallel to an optical axis of the excimer laser beam 12 is formed in the processing target 15.

A face inclining with respect to the optical axis of the excimer laser beam 12 can be formed in the processing target 15 by moving the processing target 15 while being irradiated with the excimer laser beam 12.

Figure 12:
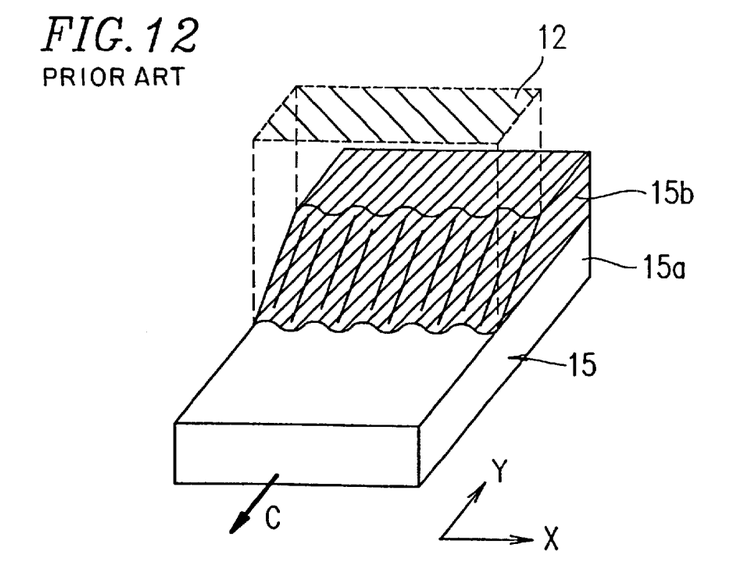
FIG. 12 is a schematic isometric view illustrating a technique for forming an inclining face by a conventional laser processing method.

With respect to FIG. 12, a method for producing the inclining face will be described.

The processing target 15 includes a substrate 15a and an organic sheet 15b bonded to the substrate 15a. For irradiating the processing target 15 with the excimer laser beam 12, conditions for ablating only the organic sheet 15b are used. The excimer laser beam 12 transmitted through the rectangular light transmitting area 13a of the projection mask 13 is directed toward the processing target 15. In this state, the processing target 15 is moved in the direction of arrow C shown in FIG. 12 at a constant speed. A surface of the substrate 15a is perpendicular to the optical axis.

While the processing target 15 is moved in this manner, the irradiation of the excimer laser beam 12 is stopped. Therefore, the total amount of the excimer laser beam 12 received by a front portion of the processing target 15 is different from the total amount of the excimer laser beam 12 received by a rear portion of the processing target 15. The terms "front" and "rear" are defined with respect to the direction in which the processing target 15 is moved. As a result of the above-mentioned difference in the total amount of received excimer laser beam 2, the processing target 15 is etched to a different degree in the front portion compared to the rear portion. Therefore, the inclining face which inclines downward from the rear portion toward the front portion of the processing target 15 is formed. A face inclining at any angle can be formed by adjusting the intensity of the excimer laser beam 12 and the moving speed of the processing target 15.

FIG. 7 shows a profile 29 (solid line) of the recessed portion obtained by ablating the surface of the processing target 15 by the laser processing apparatus 200. Since the entirety of the light transmitting area 13a is irradiated with the excimer laser beam 12, the entirety of the profile 29 is wave-shaped, as opposed to an ideal profile 30 (dashed line) which is formed of four straight sides.

The reason why the profile 29 is wave-shaped is because the excimer laser beam 12 transmitted through the light transmitting area 13a of the projection mask 13 is diffracted by edges (i.e., both of the longer sides 21a and the shorter sides 21b; see FIG. 6) of the light transmitting area 13a.

FIG. 8 shows a light intensity distribution of the excimer laser beam 12 irradiating the surface of the processing target 15 after being transmitted through the light transmitting area 13a. Since the excimer laser beam 12 is diffracted by the edges of the light transmitting area 13a, the light intensity received by the surface of the processing target 15 is not uniform, but portions having a higher light intensity than the rest of the surface appear in a lattice pattern as shown in FIG. 8. Since these portions are ablated more strongly than the rest of the surface the entirety of the profile 29 is wave-shaped.

Figure 9:
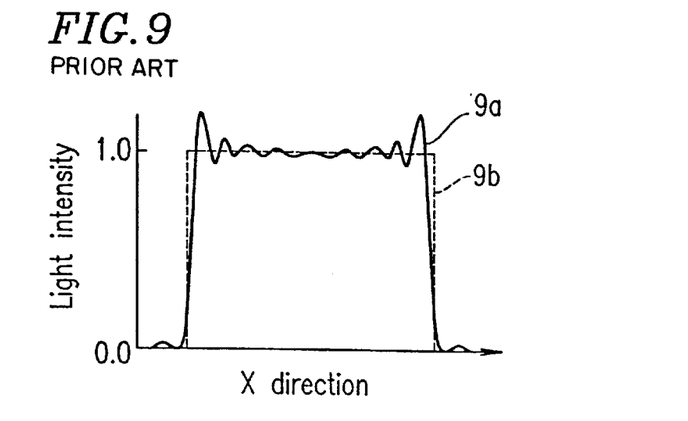
FIG. 9 is a graph illustrating a light intensity distribution irradiating the surface of the processing target in accordance with the conventional laser processing method.

FIG. 9 is a graph illustrating light intensity distributions of the excimer laser beam 12 irradiating the surface of the processing target 15 along the X direction. A solid line 9a represents a light intensity distribution actually obtained by the laser processing apparatus 200. A dashed line 9b represents a light intensity distribution obtained when the excimer laser beam 12 is not diffracted by the edges of the light transmitting area 13a. The solid line 9a in FIG. 9 corresponds to the lattice shown in FIG. 8. The solid line 9a has peaks having a light intensity level of higher than 1 (referred to as "overshoot") at positions corresponding to the vicinity of the shorter sides 21b of the light transmitting area 13a (FIG. 6). In addition, the solid line 9a fluctuates in a central portion thereof.

Since it is substantially unavoidable that the light is diffracted at the edges of the light transmitting area 13a, it is difficult to form a recessed portion defined by flat faces as shown by the dashed line 30 in FIG. 7. The inclining face shown in FIG. 12 is also wave-shaped, and it is difficult to form a flat inclining face for the same reason.

Figure 10:
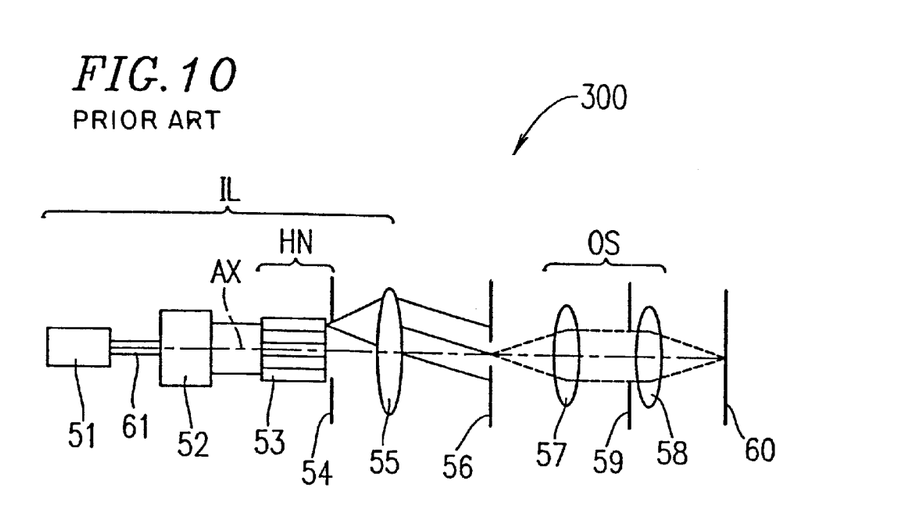
FIG. 10 is a schematic view illustrating a structure of a conventional laser processing apparatus.

Japanese Laid-Open Publication No. 9-206974 discloses a method for improving a light intensity distribution characteristic of a laser beam irradiating a processing target after being transmitted through a light transmitting area of a projection mask. FIG. 10 is a schematic view of a laser processing apparatus 300 disclosed in Japanese Laid-Open Publication No. 9-206974.

Referring to FIG. 10, the laser processing apparatus 300 includes an irradiation optical system IL for uniformly irradiating a projection mask 56 with components of laser light in a superimposing manner. The irradiation optical system IL includes an excimer laser oscillator 51, a beam shaping optical system 52, a fly-eye lens 53 as a homogenizer HN, an aperture 54, and a condenser lens 55. A laser beam 61 emitted by the excimer laser oscillator 51 is enlarged in cross-sectional area by the beam shaping optical system 52 and is directed toward the fly-eye lens 53. The fly-eye lens 53 includes a plurality of lens elements each having a longitudinal axis parallel to an optical axis AX of the laser beam 61. Components of the laser beam 61 coming out of the fly-eye lens 53 reach the condenser lens 55 through the aperture 54 and are collimated by the condenser lens 55. The collimated components of light irradiate the projection mask 56 in a superimposing manner. A light spot of the laser beam 61 on the projection mask 56 covers and thus uniformly irradiates the entirety of a rectangular light transmitting area of the projection mask 56.

The laser beam 61 transmitted through the light transmitting area of the projection mask 56 is collected on a processing target 60 by an imaging optical system OS, which includes two lenses 57 and 58 and an aperture 59. A recessed portion having a pattern corresponding to the light transmitting area of the projection mask 56 is formed in the processing target 60 by ablation provided by the laser beam 61.

Where a numerical aperture of the irradiation optical system IL is NAc and a numerical aperture of the imaging optical system OS is NAo, the coherence factor σ is defined by expression (1).

$$\sigma = NAc/NAo \qquad (1)$$

Figure 11A:
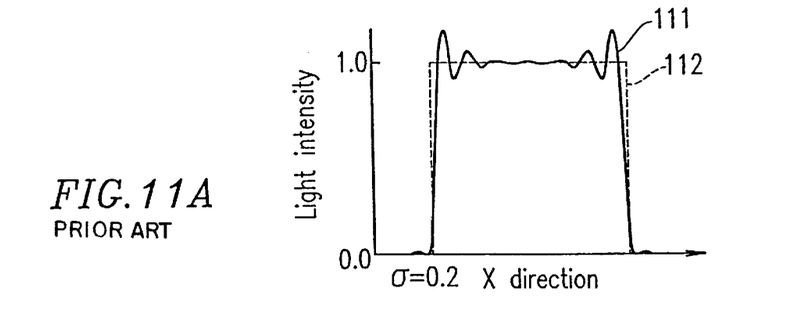
FIGS. 11A and 11B show light intensity distributions of a laser beam irradiating a processing target in accordance with the conventional laser processing method, at different values of coherence factor.
Figure 11B:
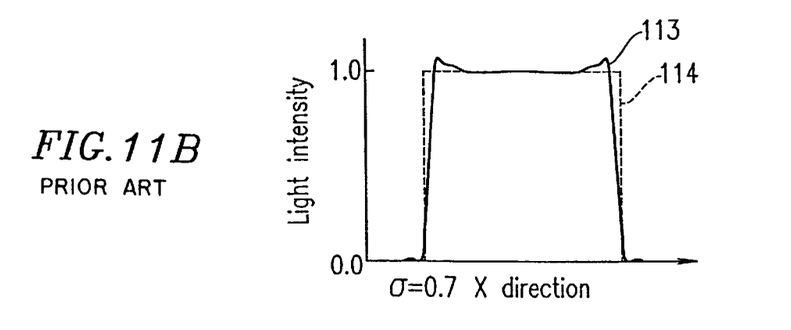

FIGS. 11A and 11B show light intensity distributions of the excimer laser beam 12 irradiating the processing target 60 along the X direction. A solid line 111 in FIG. 11A shows a light intensity distribution obtained when the coherence factor σ is 0.2, and a solid line 113 in FIG. 11B shows the light intensity distribution obtained when the coherence factor a is 0.7. A dashed line 112 in FIG. 11A and a dashed line 114 in FIG. 11B each show a light intensity distribution obtained when the laser beam 61 is not diffracted by the edges of the light transmitting area.

The solid line 113 in FIG. 11B exhibits smaller peaks (smaller overshoot portions) and fluctuates less in the central portion than the solid line 111 in FIG. 11A. It is appreciated that an increase in the coherence factor a prevents the intensity of the laser beam from increasing in portions of the surface of the processing target 60 corresponding to the edges of the light transmitting area of the projection mask 56. The increase in the coherence factor a also alleviates fluctuations in the intensity of the laser beam in a portion of the surface of the processing target 60 corresponding to a central area of the light transmitting area of the projection mask 56. When the coherence factor σ is 0.6 or more, a recessed portion defined by flat faces parallel to the optical axis AX (FIG. 10) can be formed in the processing target 60 at relatively high precision.

However, it is still difficult to completely remove the influence of the diffraction of the laser beam by the edges of the light transmitting area as can be appreciated from FIG. 11B. Thus, it is difficult to completely prevent a local increase in the intensity of the laser beam. Formation of a flat face in a processing target, whether parallel or inclining with respect to an optical axis of a laser beam, has not been realized.

SUMMARY OF THE INVENTION

A laser processing method according to the present invention includes the steps of irradiating a projection mask having a light transmitting area, for allowing a laser beam to be transmitted therethrough, with the laser beam; and irradiating a processing target with the laser beam transmitted through the light transmitting area. A spot of the laser beam on the projection mask is shaped so as to irradiate a portion in the vicinity of first edges of the light transmitting area, the first edges extending in one direction, and so as not to irradiate a portion in the vicinity of second edges of the light transmitting area, the second edges extending in a second direction which is different from the first direction.

In one embodiment of the invention, the light transmitting area of the projection mask has a shape of a rectangle which extends in the first direction.

In one embodiment of the invention, the second edges of the light transmitting area are shorter sides of the rectangle.

In one embodiment of the invention, the laser processing method further includes the step of moving the processing target in the first direction.

In one embodiment of the invention, the laser processing method further includes the step of moving the processing target in the second direction.

In one embodiment of the invention, the laser processing method further includes the step of reciprocating the processing target in the first direction concurrently with moving the processing target in the second direction.

Thus, the invention described herein makes possible the advantages of providing a low-cost laser processing method for relatively easily controlling diffraction of a laser beam at an edge of a light transmitting area of a projection mask so as to guarantee formation of a flat face in a processing target, whether parallel or inclining to an optical axis of a laser beam.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Figure 1:
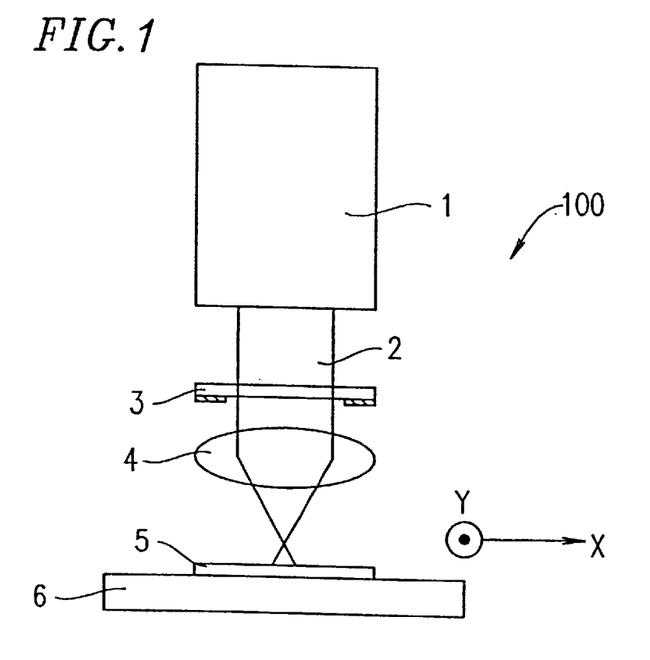
FIG. 1 is a schematic view illustrating a structure of a laser processing apparatus used for a laser processing method according to the present invention.

A laser processing method according to the present invention is performed by a laser processing apparatus 100 shown in FIG. 1.

The laser processing apparatus 100 is used for, for example, forming a recessed portion in a processing target 5. The processing target 5 includes an organic sheet formed of, for example, polycarbonate (PC) or polyethylene terephthalate (PET) which is degraded when irradiated with light such as a laser beam. The laser processing apparatus 100 includes an X-Y stage 6 on which the processing target 5 is placed, and a laser oscillator 1 for emitting an excimer laser beam 2 toward the processing target 5. The excimer laser beam 2 emitted by the laser oscillator 1 is provided with a prescribed rectangular pattern through a projection mask 3. The excimer laser beam 2 is then reduced in cross-sectional area by an objective optical system 4, and is directed toward the processing target 5 fixed on the X-Y stage 6. The excimer laser beam 2 emitted by the laser oscillator 1 has a rectangular cross-section, and the size of the rectangle is, for example, 25 mm×8 mm in this example.

Figure 2:
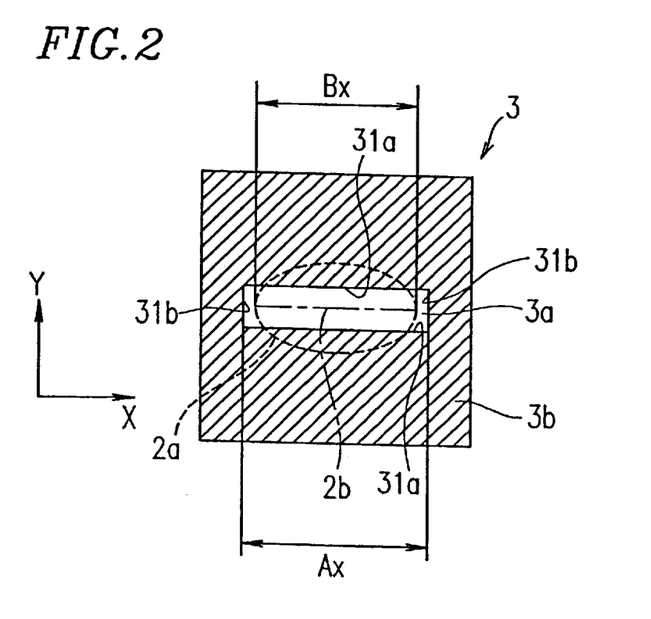
FIG. 2 is a plan view of a projection mask used for the present invention.

FIG. 2 is a plan view of the projection mask 3. The projection mask 3 is formed of a glass plate and a metal film provided on the glass plate so as to form a light shielding area 3b. An area of the glass plate which is not covered with the metal film is a rectangular light transmitting area 3a through which the excimer laser beam 2 is allowed to be transmitted.

Figure 3:
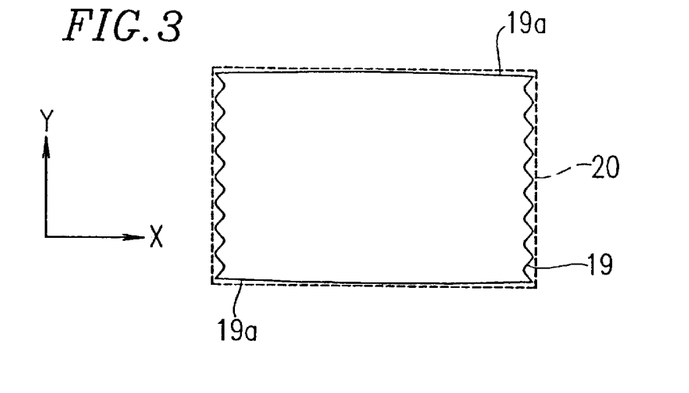
FIG. 3 is a schematic view illustrating a profile of a recessed portion formed by a laser processing method according to the present invention.
Figure 4:
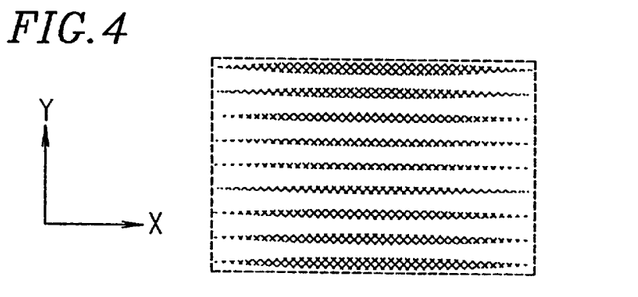
FIG. 4 is a schematic view illustrating a light intensity distribution irradiating a surface of a processing target in accordance with the laser processing method according to the present invention.

A spot 2a of the excimer laser beam 2 on the projection mask 3 is elliptical. In FIG. 2, the length of a longer axis 2b of the spot 2a is represented by "Bx", and the length of longer sides 31a of the light transmitting area 3a is represented by "Ax". The longer sides 3a are parallel to the longer axis 2b, and the length Ax of the longer sides 31a is greater than the length Bx of the longer axis 2b. The optical axis of the excimer laser beam 2 is positioned so that the spot 2a does not cover the shorter sides 31b of the light transmitting area 3a. In FIGS. 2, 3 and 4, arrow X represents the direction of longer sides 31a of the rectangular light transmitting area 3a (X direction), and arrow Y represents the direction of shorter sides 31b of the rectangular light transmitting area 3a (Y direction).

According to the present invention, sides of the rectangular light transmitting area 3a, the sides extending in one direction, are longer than the axis of the spot 2a extending parallel to the above-mentioned sides. In addition, the spot 2a does not cover the end portions of the above-mentioned sides. In the following description, the sides 31a of the light transmitting area 3a are longer than the longer axis 2b in the X direction, and the end portions of the sides 31a are not irradiated with the excimer laser beam 2.

In an alternative structure, the light transmitting area 3a is longer in the Y direction than in the X direction, and the excimer laser beam 2 is directed so as not to cover the shorter sides of the light transmitting area 3a. A similar effect is provided.

Referring to FIG. 1, the excimer laser beam 2 which is transmitted through the light transmitting area 3a of the projection mask 3 is reduced in cross-sectional area by the objective optical system 4 and collected on the processing target 5 fixed on the X-Y stage 6. Thus, an image of the rectangular light transmitting area 3a is projected on the processing target 5. The image on the processing target 5 reflects the reduction ratio of the objective optical system 4. A surface of the processing target 5 irradiated with the excimer laser beam 2 is ablated with the excimer laser beam 2. As a result, a recessed portion defined by faces parallel to an optical axis of the excimer laser beam 2 is formed in the processing target 5.

In this example, the surface of the processing target 5 and the surface of the X-Y stage 6 are perpendicular to the optical axis of the excimer laser beam 2. Accordingly, the direction parallel to the optical axis is vertical to the surface of the processing target 5 and the surface of the X-Y stage 6.

FIG. 3 shows a profile 19 (solid line) of the recessed portion obtained by ablating the surface of the processing target 5 by the laser processing apparatus 100. A profile 20 (dashed line) is an ideal profile which is formed of four straight sides.

The spot 2a does not cover and thus is not diffracted by the shorter sides 31b of the light transmitting area 3a as shown in FIG. 2. Accordingly, sides 19a, corresponding to the longer sides 31a, of the profile 19 are straight and substantially overlap the ideal profile 20.

FIG. 4 shows a light intensity distribution of the excimer laser beam 2 irradiating the surface of the processing target 5 after being transmitted through the light transmitting area 3a. Since the excimer laser beam 2 is diffracted by the longer sides 31a of the light transmitting area 3a, portions having a higher light intensity than the rest of the surface appear in stripes parallel to the X direction as shown in FIG. 4. Since the excimer laser beam 2 is not diffracted by the shorter sides 31b of the light transmitting area 3a, no stripes appear parallel to the shorter sides 31b.

The surface of the processing target 5 is ablated by the excimer laser beam 2 having such a light intensity distribution. As a result, the faces parallel to the X direction of the X-Y stage 6 among the faces defining the recessed portion are flat, instead of wave-shaped, as represented by the profile 19 in FIG. 3. (The faces parallel to the X direction of the X-Y stage 6 will be referred to as the "X direction faces".)

Figure 5:
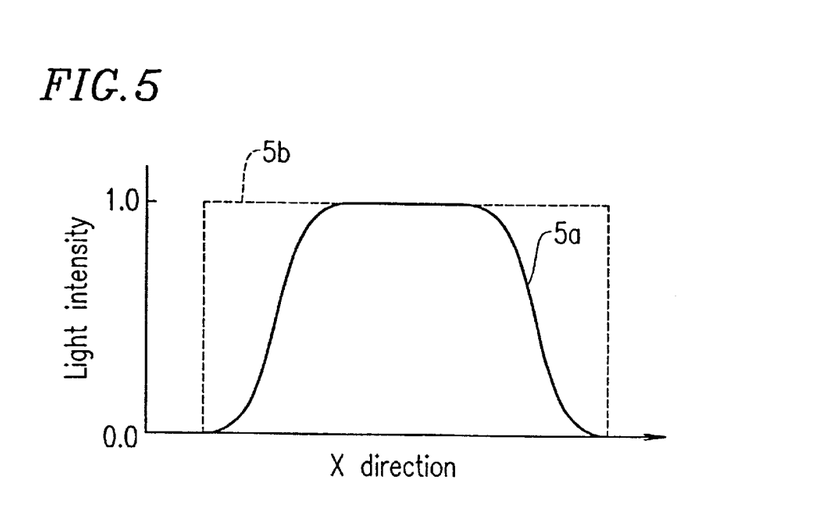
FIG. 5 is a graph illustrating a light intensity distribution irradiating the surface of the processing target in accordance with the laser processing method according to the present invention.

FIG. 5 is a graph illustrating light intensity distributions of the excimer laser beam 2 irradiating the surface of the processing target 5 along the X direction. A solid line 5a represents a light intensity distribution actually obtained by the laser processing apparatus 100. A dashed line 5b represents a light intensity distribution obtained when the excimer laser beam 2 is not diffracted by any edge of the light transmitting area 3a. The solid line 5a in FIG. 5 corresponds to the stripes shown in FIG. 4. The solid line 5a is substantially plateau and matches the dashed line 5b in a central portion thereof. However, since the length Ax (FIG. 2) of the longer sides 31a of the light transmitting area 3a is longer than the length Bx of the spot 2a, the solid line 5a is offset from the dashed line 5b at portions corresponding to the shorter edges 31b of the light transmitting area 3a.

Use of the projection mask 3 reduces the adverse effect of the diffraction of the excimer laser beam 2 at the edges of the light transmitting area 3a. However, when the excimer laser beam 2 has distributions in terms of light intensity in the X direction when incident on the projection mask 3, the distribution results in wave-shaped faces defining the recessed portion. This inconvenience can be alleviated by performing scanning, i.e., by moving the processing target 5 in the direction in which the longer sides 31a of the light transmitting area 3a is longer than the longer axis 2b of the spot 2a (i.e., the X direction), in the range that the spot 2a does not cover the shorter sides 31b of the light transmitting area 3a. Thus, the influence of the distribution of the excimer laser beam 2 in terms of light intensity is alleviated, resulting in improving the flatness of the X direction faces defining the recessed portion. The same effect is provided by reciprocating the optical axis of the excimer laser beam 2 with the processing target 5 being kept still.

An inclining face can also be formed by the combination of the projection mask 3 and the scanning as described below.

The elliptical shape of the spot 2a of the excimer laser beam 2 is adjusted so as not to cover the shorter sides 31b of the light transmitting area 3a, and the processing target 5 is moved at a constant speed along the shorter sides 31b in the state of being irradiated with the excimer laser beam 2. While the processing target 5 is moved, the irradiation of the excimer laser beam 2 is stopped. As a result, the inclining face which inclines downward from the rear portion toward the front portion of the processing target 5 is formed by the principle described above with reference to FIG. 12. Whereas in the case of FIG. 12, the excimer laser beam 12 having the light intensity distribution causes the inclining face to have corrugations; in the case of the present invention, the inclining face is flat with no such corrugations owing to the excimer laser beam 2 having the light intensity distribution shown in FIG. 4.

Even when the projection mask 3 is used, the spot 2a has a cyclic light intensity distribution in the Y direction as shown in FIG. 4. Since the above-mentioned scanning is performed in the Y direction, however, the cyclic light intensity distribution does not cause any significant problem.

Figure 13:
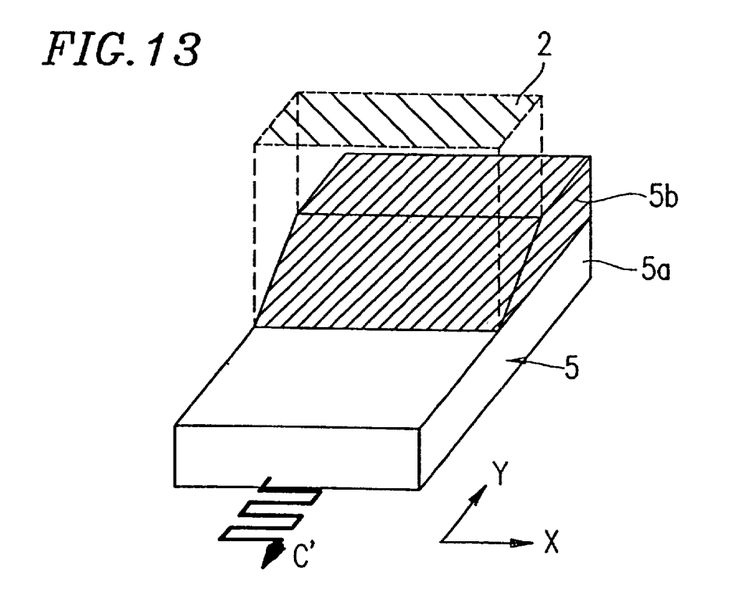
FIG. 13 is a schematic isometric view illustrating a technique for forming an inclining face by a laser processing method according to the present invention.

As in the case of forming faces vertical to the surface of the processing target 5, when the excimer laser beam 2 has distributions in terms of light intensity in the X direction when incident on the projection mask 3, the distribution results in a wave-shaped inclining face. This inconvenience can be alleviated by moving the processing target 5 in the X direction as shown by arrow C' in FIG. 13 while moving the processing target 5 in the Y direction. Thus, the influence of the distribution of the excimer laser beam 2 in terms of light intensity is alleviated, resulting in improving the flatness of the inclining face.

In the above example, a recessed portion having a prescribed pattern is formed in a processing target. The present invention is applicable to formation of a through-hole having a prescribed pattern in a processing target.

EXAMPLES

Example 1

The laser processing method according to the present invention was performed using an excimer laser processing apparatus (KrF laser; wavelength: 248 nm; oscillation output: 270 mJ; oscillation frequency: 200 pulses/s) produced by Sumitomo Heavy Industries, Ltd. as the laser processing apparatus 100 shown in FIG. 1. As the processing target 5, a PET sheet having a thickness of 200 $\mu$m bonded on a silicon substrate was used. The processing target 5 was fixed on the X-Y stage 6. The excimer laser beam 2 emitted by the light source had a cross-section of 25 mm×8 mm. The rectangular light transmitting area 3a of the projection mask 3 had a size of 30 mm×3 mm.

The longer sides 31a of the light transmitting area 3a was provided so as to be parallel to the longer axis 2b of the spot 2a, and the center of the spot 2a was matched to the center of the light transmitting area 3a. Since the length Bx of the longer axis 2b of the spot 2a was 25 mm and the length Ax of the longer sides 31a of the light transmitting area 3a was 30 mm, the shorter sides 31b of the light transmitting area 3a were not irradiated with the spot 2a.

It was set so that the excimer laser beam 2 transmitted through the light transmitting area 3a was reduced in cross-sectional area to ⅓ by the objective optical system 4.

A prescribed laser processing process was performed in this state for forming a recessed portion in the processing target 5. The planar precision (or flatness) of the X direction faces defining the recessed portion was measured by an interferometer produced by Zygo Corporation. The resultant RMS value was 50 nm, which was significantly satisfactory.

Example 2

A recessed portion was formed in the processing target 5 in the same manner as in Example 1 except that while the processing target 5 was irradiated with the excimer laser beam 2, the X-Y stage 6 having the processing target 5 fixed thereon was moved in the X direction.

The planar precision of the X direction faces defining the recessed portion was measured by the interferometer produced by Zygo Corporation. The resultant RMS value was 40 nm, which was more satisfactory than the RMS value in Example 1.

Example 3

A face inclining with respect to the surface of the processing target 5 was formed in the same manner as in Example 1 except that while the processing target 5 was irradiated with the excimer laser beam 2, the X-Y stage 6 having the processing target 5 fixed thereon was moved in the Y direction.

The planar precision of the inclining face was measured by the interferometer produced by Zygo Corporation. The resultant RMS value was 120 nm, which was significantly satisfactory.

Example 4

A face inclining with respect to the surface of the processing target 5 was formed in the same manner as in Example 3 except that while the processing target 5 was irradiated with the excimer laser beam 2, the X-Y stage 6 having the processing target 5 fixed thereon was reciprocated in the X direction while moved in the Y direction.

The planar precision of the inclining face was measured by the interferometer produced by Zygo Corporation. The resultant RMS value was 60 nm, which was more satisfactory than the RMS value in Example 3.

Comparative Example 1

A recessed portion was formed in a processing target in the same manner as in Example 1 except that a projection mask having a rectangular light transmitting area having a size of 6 mm×3 mm was used. The spot 2a was 25 mm×8 mm as in Example 1.

The planar precision of the inclining face was measured by the interferometer produced by Zygo Corporation. The resultant RMS value was 80 nm, which was inferior to the RMS values in Examples 1 and 2.

Comparative Example 2

A face inclining with respect to the surface of the processing target was formed in the same manner as in Example 3 except that a projection mask having a rectangular light transmitting area having a size of 6 mm×3 mm was used. The spot 2a was 25 mm×8 mm as in Example 3.

The planar precision of the inclining face was measured by the interferometer produced by Zygo Corporation. The resultant RMS value was 200 nm, which was inferior to the RMS values in Examples 3 and 4.

A laser processing method according to the present invention uses a projection mask having a transmitting area which is longer in one direction than the axis of the spot of a laser beam. Therefore, the influence of diffraction of the laser beam at the edges of the light transmitting area is alleviated. Thus, faces which are vertical or inclining to the surface of a processing target can be formed with satisfactorily high precision.

The planar precision of the faces is also enhanced by performing scanning in one axis, i.e., in the direction of the longer sides of the light transmitting area or the direction perpendicular thereto; and is further enhanced by performing scanning in two axis, in both of the directions concurrently.

The laser processing method according to the present invention, which is realized only by changing the shape of the light transmitting area of the projection mask conventionally used, is advantageous in terms of cost.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A laser processing method, comprising the steps of:
   providing a projection mask having a light transmitting area;
   irradiating the projection mask with a laser beam, for allowing a laser beam to be transmitted through said light transmitting area;
   irradiating a processing target with the laser beam transmitted through the light transmitting area; and
   continuously moving the processing target in a first direction;
   wherein a spot of the laser beam on the projection mask is shaped so as to irradiate a portion in the vicinity of first edges of the light transmitting area, the first edges extending in a first direction, and so as not to irradiate a portion in the vicinity of second edges of the light transmitting area, the second edges extending in a second direction which is different from the first direction.

2. A laser processing method according to claim 1, further comprising the step of moving the processing target in the second direction.

3. A laser processing method according to claim 2, further comprising the step of reciprocating the processing target in the first direction concurrently with moving the processing target in the second direction.

4. A laser processing method according to claim 1, wherein the light transmitting area of the projection mask has a shape of a rectangle longer edges of which extend in the first direction.

5. A laser processing method according to claim 4, further comprising the step of moving the processing target in the second direction.

6. A laser processing method according to claim 5, further comprising the step of reciprocating the processing target in the first direction concurrently with moving the processing target in the second direction.

7. A laser processing method according to claim 1, wherein the second edges of the light transmitting area are shorter sides of the rectangle.

8. A laser processing method according to claim 7, further comprising the step of moving the processing target in the second direction.

9. A laser processing method according to claim 8, further comprising the step of reciprocating the processing target in the first direction concurrently with moving the processing target in the second direction.

* * * * *

UNITED STATES PATENT AND TRADEMARK OFFICE
CERTIFICATE OF CORRECTION

PATENT NO.    : 6,570,124 B2
DATED         : May 27, 2003
INVENTOR(S)   : Kuniaki Okada It is certified that error appears in the above-identified patent and that said Letters Patent is hereby corrected as shown below:

<u>Title page,</u>
Item [73], Assignee, please add -- Sharp Kabushiki Kaisha, Osaka, Japan --

Signed and Sealed this

Twenty-seventh Day of January, 2004

JON W. DUDAS
*Acting Director of the United States Patent and Trademark Office*